United States Patent [19]

Persoon et al.

[11] Patent Number: 4,916,659

[45] Date of Patent: Apr. 10, 1990

[54] PIPELINE SYSTEM WITH PARALLEL DATA IDENTIFICATION AND DELAY OF DATA IDENTIFICATION SIGNALS

[75] Inventors: Eric H. J. Persoon; Johannes A. C. Bernsen, both of Eindhoven, Netherlands

[73] Assignee: U.S. Philips Corporation, New York, N.Y.

[21] Appl. No.: 161,566

[22] Filed: Feb. 18, 1988

[30] Foreign Application Priority Data

Mar. 5, 1987 [NL] Netherlands .................. 8700530

[51] Int. Cl.$^4$ .................................. G06F 9/00
[52] U.S. Cl. .............................. 364/900; 364/948.34; 364/964.26
[58] Field of Search .................. 364/200, 900

[56] References Cited

U.S. PATENT DOCUMENTS

| | | | |
|---|---|---|---|
| 4,210,962 | 7/1980 | Marsh et al. | 364/402 |
| 4,507,728 | 3/1985 | Sakamoro et al. | 364/200 |
| 4,574,345 | 3/1986 | Kowesky | 364/200 |

OTHER PUBLICATIONS

Shigeru Sasaki et al., "High Speed Pipeline Image Processor with a Modifiable Network", Proc. First International Conf. on Supercomputing Systems (St. Petersburg, Fla., Dec. 16-20, 1985), pp. 476-484.

Primary Examiner—Gareth D. Shaw
Assistant Examiner—John G. Mills
Attorney, Agent, or Firm—Thomas A. Briody; Jack E. Haken; Anne E. Barschall

[57] ABSTRACT

A pipeline system which is suitable for the processing of data accompanied by data identifying signals comprises interconnected modules which process the data and which controllably transfer the data to one another. Data processing in a module introduces a delay of the data. For correct data processing in a module, the data identifying signals must be in synchronism with the data. In a pipeline system in accordance with the invention, the data identifying signals are applied in parallel to all modules, these signals being delayed in a module by a delay means until the data whereto the signals relate have reached the relevant module. The foregoing has the advantage that the number of connections between the modules is reduced.

13 Claims, 1 Drawing Sheet

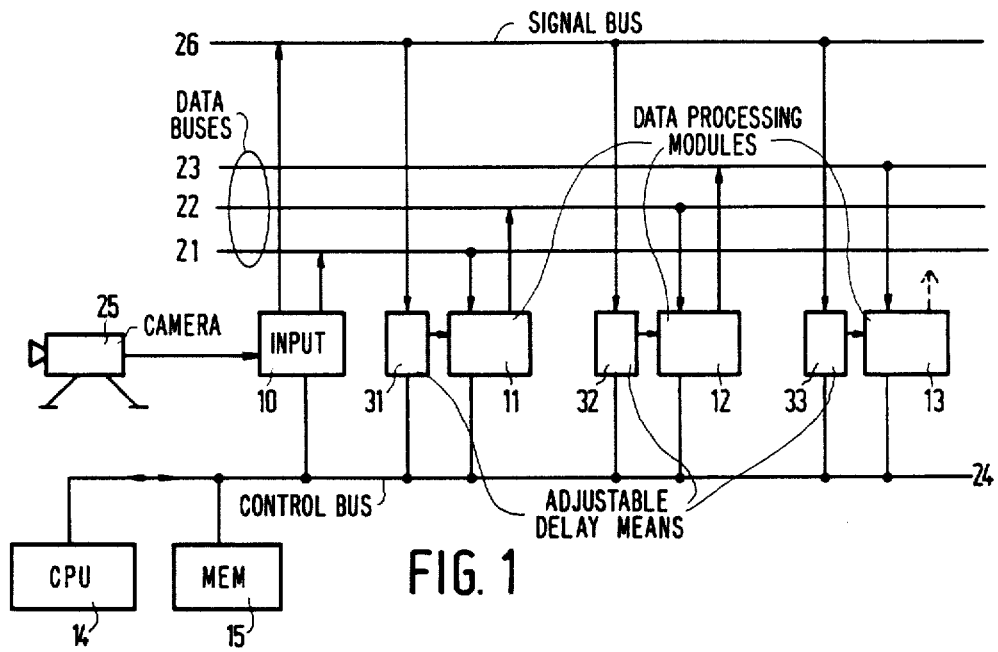
FIG. 1
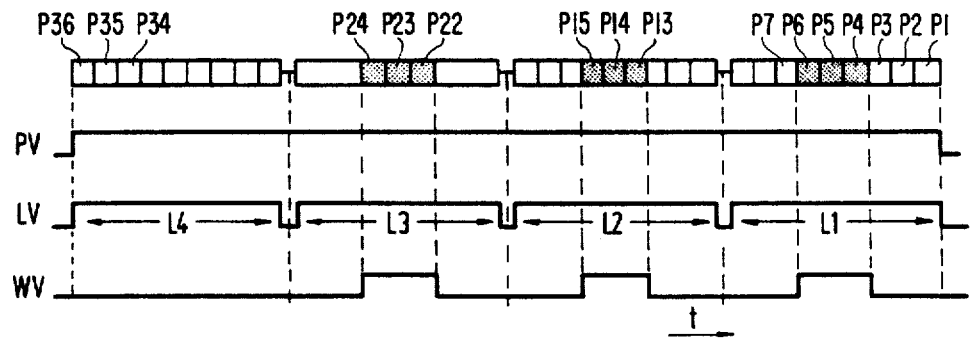
FIG. 2
FIG. 3

PIPELINE SYSTEM WITH PARALLEL DATA IDENTIFICATION AND DELAY OF DATA IDENTIFICATION SIGNALS

BACKGROUND OF THE INVENTION

1. Field of the Invention

The invention relates to a pipeline system for the processing of data accompanied by data identification signals, which pipeline system comprises:

(a) data processing modules, (b) communication means for interconnecting the modules, (c) control means for controlling the pipeline system via a control connection whereto the modules are connected, (d) a memory for the storage of information concerning a configuration of the pipeline system and also concerning a processing delay introduced by each module, which memory is connected to the control means, (e) for each module a delay means for delaying the data identification signals.

2. Prior Art

A data processing pipeline system of this kind is known from Proc. IEEE "First International Conference on Supercomputing Systems", St. Petersburg, Fla., U.S.A., Dec. 16-20, 1985, pages 476-484, and is constructed as an image processing system. The known system comprises modules which are interconnected via a network of adjustable switch elements. The connections between the modules can be modified by way of this network. The modules and the network are controlled via a computer which is coupled thereto via a control bus. As is known, a module in a pipeline system simultaneously receives data, processes data and outputs data. The data identification signals applied to the module serve to enable the module to recognize groups of coherent data. The data and the data identification signals are applied in synchronism to the input of the pipeline system. When a module executes operations on the data which require a given period of time, the data on the output of the module would no longer be in synchronism with the data identification signals if the latter were not delayed by an amount corresponding to the duration of execution. Therefore, each module in a pipeline system according to the present state of the art comprises a delay means for the data identification signals. The network enables an arbitrary combination of connections between said modules and imparts the desired flexibility to the system.

A drawback of the known system is formed by the large number of communication lines interconnecting the modules via the network. The processed data as well as the delayed data identification signals are transferred from each module to the subsequent modules in the processing structure.

SUMMARY OF THE INVENTION

It is an object of the invention to provide a simpler pipeline system which comprises a smaller number of connections between the modules.

To achieve this, a pipeline system in accordance with the invention is characterized in that there are provided means for applying the data identification signals in parallel to the delay means.

When the data identification signals are applied in parallel to the modules, these signals are delayed by the delay means present in each module until the data whereto the data identifying signals relate have reached the respective module. For each individual module the delay incurred by the data identification signals equals the sum of the processing delays introduced by the data processing in all preceding modules wherethrough the data have been conducted on their way to the relevant module, in as far as these preceding modules are connected in series in the processing structure. Because the data identifying signals in a pipeline system in accordance with the invention are not transferred from one module to another, a number of connections between the modules is saved.

It is also an object of the invention to provide a flexible pipeline system. To achieve this, a pipeline system in accordance with the invention is also characterized in that the delay means are adjustable via the control means.

In order to enable the control means to adjust the correct cumulative delay in the delay means, the delay is calculated on the basis of the information concerning the configuration of the pipeline system and the processing delay of each module. A pipeline system in accordance with the invention is highly flexible because, after a reconfiguration or extension which is recognized by the control means, only renewed adjustment of the delay means for each module will be required.

An embodiment of a pipeline system in accordance with the invention is also characterized in that the communication means comprise a bus whereto the modules are connected. A bus system represents a simple and inexpensive communication means. A bus system increases the flexibility of a pipeline system in accordance with the invention in that, in the case of a possible reconfiguration and extension, the modules need only be connected to a common supply lead for the data identification signals, a common control connection for connection to the control means, and a common bus for transferring and receiving the data. This results in a simple architecture.

BRIEF DESCRIPTION OF THE DRAWING

The invention will be described in detail hereinafter with reference to a drawing; therein:

FIG. 1 shows an image processing system constructed as pipeline system in accordance with the invention, FIG. 2 shows pixels of an input image, FIG. 3 shows two examples of accompanying data identification signals in an image processing system.

DETAILED DESCRIPTION OF THE PREFERRED EMBODIMENT

Of an image processing pipeline system in accordance with the invention FIG. 1 shows an input module 10, data processing modules 11, 12 and 13, a control CPU 14, and a system memory 15. The modules are interconnected via data buses 21, 22 and 23 and are also connected to the CPU 14 and the memory 15 via a control bus 24. The output signal of a camera 25 is processed so as to form digital image data by an image module IM. In synchronism with the image data, the input module 10 applies the data identification signals to the signal bus 26. The data identification signals contain information as regards the data in dependence of which the data are processed by a data processing module as will be described hereinafter. The delay means provided for each data processing module are connected to a signal bus 26. The data identification signals are applied in parallel to the delay means 31, 32 and 33. In the processing structure shown in FIG. 1, the module 11 receives the data direclty from the input module 10, via the data bus 21. The data identification signals are transferred to the data processing module 11 without being delayed by the delay means 31. The processing of the data received by the module 11 requires some time. Consequently, the processed data are output by the module 11 after a first delay with respect to the input as well as with respect to the data identification signals. The module 12 receives the processed data from the module 11 via the data bus 22. The relevant delay means 32 imparts a delay equal to the first delay, to the data identification signals. During the processing of the data in the module 12, the data and the data identification signals are in synchronism again. The data processed by the module 12 reach the module 13 via the data bus 23. In comparison with the data identification signals, the data stream has been delayed by the sum of the first delay and the second delay when it is received by the module 13. Delay means 33 imparts a delay, equal to the sum of the first and the second delay, to the data identification signals, so that synchronized processing of the data takes place in the module 13.

The data processing modules and the delay means are connected to the control CPU 14 and the system memory 15 via the control bus 24. In the case of a reconfiguration of extension of the pipeline system, the delays for the data identification signals are adjusted again on the basis of information concerning the configuration of the pipeline system and the processing delay per module.

It is assumed that the digital image data is generated by means of the raster scan method. The raster scan method generates serial data. The serial data contain the information of the pixels in a sequence in accordance with the scanning path through the image. The scanned lines and the pixels therein, therefore, are serially arranged. Data identification signals identify, for example the individual lines within the serial data. When an input image transformed by the processing operations executed in the pipeline system is composed again, a coherent output image will be obtained by converting the processed data into the identified lines again. Other data identification signals indicate, for example a selected part (window) of the input image, on the representative data of which special operations are executed. Further possibilities exist in that data identification signals can select pixels or lines for the benefit of subsampling, or indicate which lines are situated within a selected part of the input image.

FIGS. 2 and 3 show examples of image data and the data identification signals accompanying the image data.

FIG. 2 shows an imput image consisting of four lines, each of which comprises nine pixels. The image is converted into serial data by scanning, for example one row after the other from the top downwards, and within each row from left to right. The numerals in the pixels denote the scanning sequence. The image line L1 comprises the pixels P1 to P9, the image line L2 comprises the pixels P10 to P18, the image line L3 comprises the pixels P19 to P27, and the image line L4 comprises the pixels P28 to P36. A window W enables selection of a part of the image. Therein there are selected the pixels P4, P5, P6, P13, P14, P15, P22, P23 and P24. The serial image data are shown in FIG. 3. The data are denoted by the same reference numerals as the pixels in FIG. 2. The sequence corresponds to the scanning sequence: the pixel P1 is the first pixel scanned and the pixel P36 is the last pixel scanned. The window W comprises data blocks which are separated form one another in the serial representation as indicated. Accompanying data identification signals are shown on the same time base. During the scanning of the image, the signal PV, which indicates that the data relates to a single input image, is present. The signal LV indicates the individual image lines in the data. The data identification signal WV indicates the data selected by the window. An image processing system is described in greater detail in U.S. Pat. No. 4,736,438 issued to Persoon et al. in the name of Applicant which is incorporated herein by way of reference.

What is claimed is:

1. A pipeline system for processing data accompanied by data identification signals, which pipeline system comprises:
   (a) a plurality of data processing modules (11, 12, 13),
   (b) communication means (21, 22, 23) for interconnecting the data processing modules,
   (c) control means (14) for controlling the pipeline system,
   (d) a control connection (24) for coupling the control means to the data processing modules,
   (e) a memory (15) for storing information describing a configuration of the pipeline system and also describing respective processing delays introduced by each of the data processing modules, which memory is connected to the control means,
   (f) a plurality of respective delay means (31, 32, 33), one for each of the data processing modules, for delaying the data identification signals, and
   (g) means (26) for applying the data identification signals in parallel to the plurality of delay means.

2. A pipeline system as claimed in claim 1, wherein respective delays produced by the plurality of delay means are adjustable under control of the control means.

3. A pipeline system as claimed in claim 1, wherein the communication means comprises a bus whereto the data processing modules are connected.

4. An image processing system comprising a pipeline system as claimed in claim 1.

5. A pipeline system as claimed in claim 2, wherein the communication means comprises a bus whereto the data processing modules are connected.

6. The system of claim 4, wherein respective delays produced by the plurality of delay means are adjustable under control of the control means.

7. The system of claim 4, wherein the communication means comprises a bus whereto the data processing modules are connected.

8. The system of claim 6, wherein the communication means comprises a bus whereto the data processing modules are connected.

9. A module for use in pipeline system for processing data accompanied by data identification signals, the module comprising:
   (a) a data processing module for processing the data according to the data identification signals, the data processing module having:
      (i) a first input for receiving the data,
      (ii) a second input for receiving the data identification signals, and
      (iii) an output for transmitting processed data; and (b) delay means for delaying the data identification signals according to a delay which corresponds to processing delays introduced into the data prior to the data being received by the data processing module, the delay mean shaving:
  (i) a first input for receiving the data identification signals,
  (ii) a second input for receiving control signals indicating a change in the processing delays, and
  (iii) an output for supplying delayed data identification signals to the second input of the data processing module, the delay means altering the delay under control of the control signals.

10. The module of claim 9 wherein the first input of the data processing module is for coupling to another, analogous data processing module via a bus, whereby the data is pipelined from the other data processing module to the data processing module.

11. THe module of claim 9 wherein the second input of the data processing module is for coupling to another, analogous data processing module via a bus, whereby the data is pipelined from the data processing module to the other data processing module.

12. The system of claim 3 wherein
  (a) the data processing modules comprise first and last data processing modules;
  (b) the bus comprises a plurality of respective buses, one for each of the data processing modules, a first one of the buses carrying input data to the first data processing module, and a last one of the buses carrying processed data to the last data processing module from a data processing module which precedes the last data processing module.

13. The system of claim 12 wherein the data processing modules comprise at least one intermediate data processing module which receives processed data form its respective data bus and transmits further processed data along the respective bus corresponding to a following one of the data processing modules.

* * * * *